United States Patent [19]

Ducret

[11] 4,142,290
[45] Mar. 6, 1979

[54] WELDED ARMOR CUTTING TOOL

[76] Inventor: Lucien C. Ducret, 8 Apache Pl., Riverside, Conn. 06878

[21] Appl. No.: 848,902

[22] Filed: Nov. 7, 1977

Related U.S. Application Data

[63] Continuation of Ser. No. 688,134, May 20, 1976, abandoned.

[51] Int. Cl.² ........................ B21F 13/00; B26B 27/00
[52] U.S. Cl. ........................................ 30/90.9; 30/90.3
[58] Field of Search ............... 30/90.9, 90.8, 90.3, 30/91.1, 90.2

[56] References Cited

U.S. PATENT DOCUMENTS

| 2,031,470 | 2/1936 | Eck et al. | 30/90.3 |
| 2,374,753 | 5/1945 | Kramer | 30/90.9 |
| 3,633,275 | 1/1972 | Hutchinson | 30/90.3 |
| 3,851,387 | 12/1974 | Ducret | 30/90.3 |

FOREIGN PATENT DOCUMENTS

| 1261360 | 4/1961 | France | 30/90.9 |
| 283893 | 11/1952 | Switzerland | 30/90.9 |

Primary Examiner—James L. Jones, Jr.
Assistant Examiner—J. T. Zatarga
Attorney, Agent, or Firm—DeLio and Montgomery

[57] ABSTRACT

A tool for cutting electrical cable of the welded type, the tool including a circular saw blade, means for holding the cable armor against the blade, means for adjusting and limiting the penetration of the blade into the armor, and means for rotating the saw blade combined with means to propel the tool along the cable whereby the tool makes a longitudinal cut through the armor, of any desired length.

3 Claims, 7 Drawing Figures

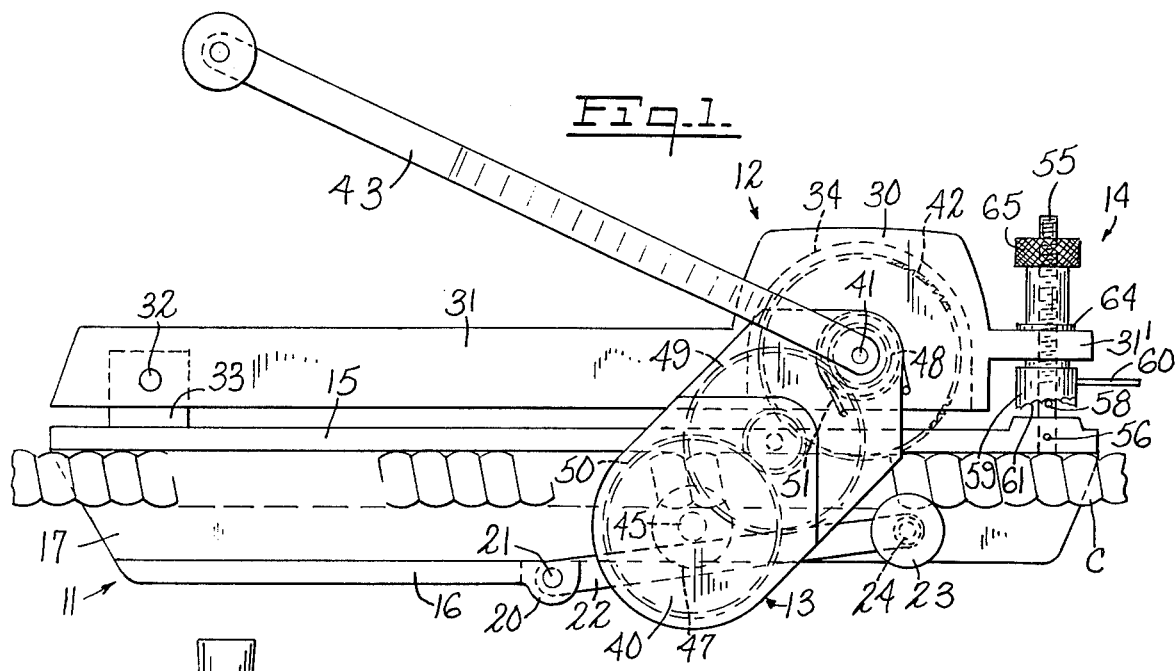
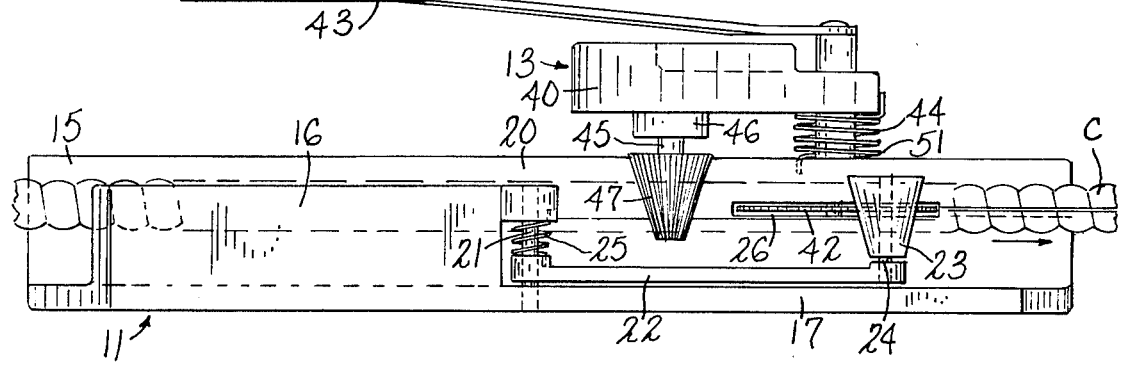
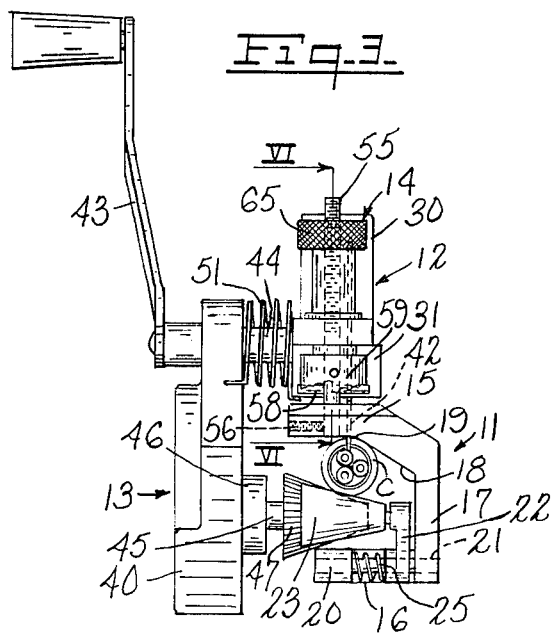

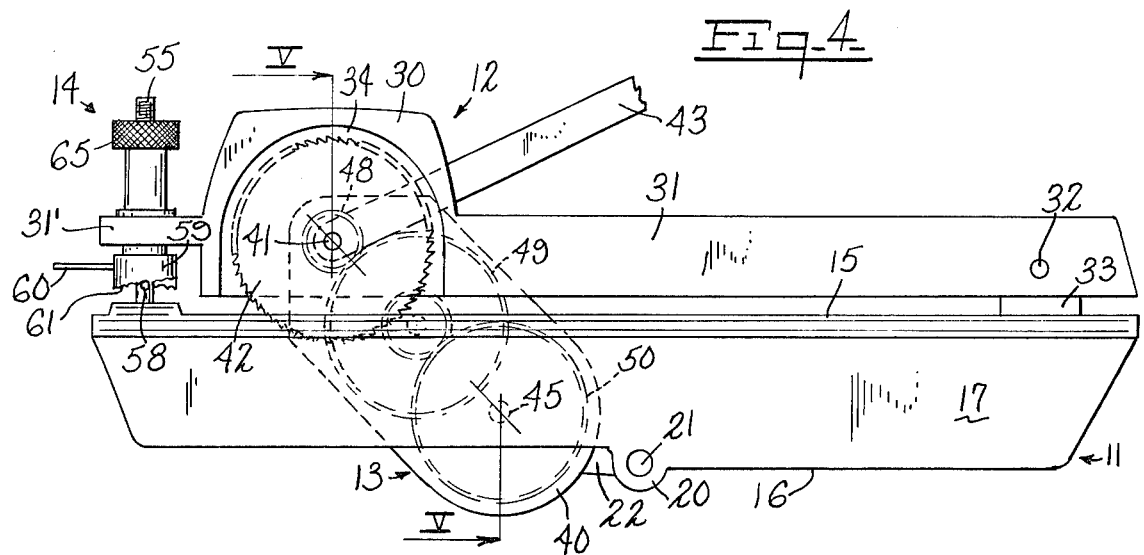
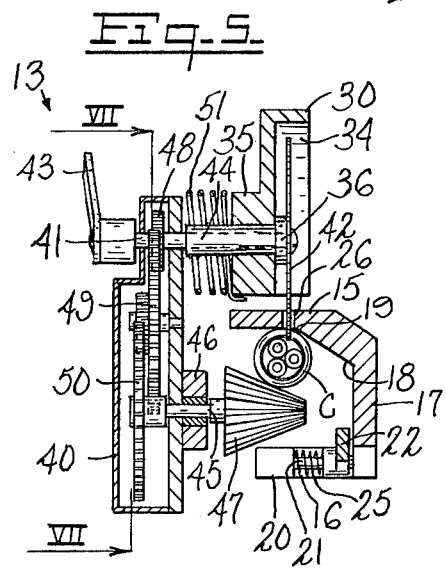
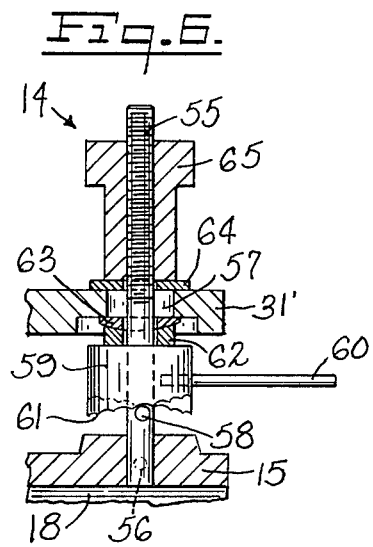
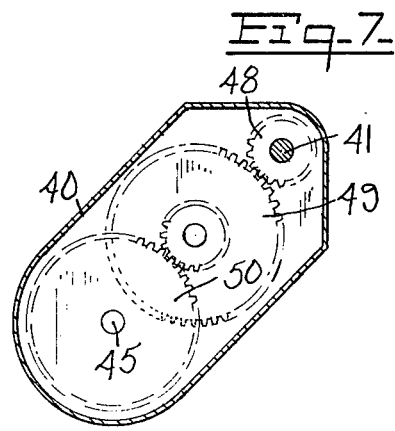

WELDED ARMOR CUTTING TOOL

This is a continuation of application Ser. No. 688,134, filed May 20, 1976, now abandoned.

This invention relates to a welded armor cutting tool for cutting electrical cable armor of the welded type, as distinguished from ordinary BX cable wherein the successive convolutions of the armor are not axially connected. A hand tool for cutting BX cable is shown in applicant's U.S. Pat. No. 3,851,387, Dec. 3, 1974, which patent constitutes part of the background of the present invention.

For certain purposes it has been found desirable to weld the seam of a convoluted armored electrical cable similar in appearance to the BX type, sometimes with the addition of a plastic jacket, as in the so-called CLX cable, such constructions exhibiting great strength and durability, with a sacrifice of flexibility, and presenting problems in connection with the cutting and skinning of short or longer sections of cable, as where the conductor elements must be more or less exposed for connection to terminals to other conductive devices.

It is important to be able to cut the shielding or armor accurately to a predetermined depth such that the cutting blade does not touch the cable materials within the shielding, this requiring the cutting blade to be maintained in a fixed relationship to the cable during the cutting operations. Whereas the cutting of a BX cable can be effected with the cable clamped rigidly in the cutting tool, as in the patent cited above, a welded armor can be cut effectively only by a tool which travels along the cable and makes an elongated incision or slit, as a first step in rendering a section of shielding or armor removable.

It is accordingly an object of the present invention to provide a tool which includes a cable guide through which the cable can be moved axially along an accurately pre-determined path, means for retaining the cable in said path, means for moving the cable and means for cutting an elongated incision in the cable shielding and/or armor.

It is a further object to the invention to provide means for adjusting the depth of the cut.

It is another object of the invention to provide a gear train by which the cutting blade and cable drive means may be operated by a single crank.

It is a still further object of this invention to provide a cable guide frame wherein cables of different diameters can be accommodated, each being held in a proper position for cutting by the cutting blade.

It is yet another object of the invention to provide certain improvements in the form, construction and arrangement of the several parts whereby the above named and other objects may effectively be attained.

The invention accordingly comprises the features of construction, combination of elements, and arrangement of parts which will be exemplified in the combination hereinafter set forth, and the scope of the invention will be indicated in the claims.

A practical embodiment of the invention is shown in the accompanying drawings, wherein:

FIG. 1 represents a side elevation of the tool with a piece of cable therein;

FIG. 2 represents a bottom plan view of the tool shown in FIG. 1, parts of the cable being broken away;

FIG. 3 represents an end elevation of the tool, from the delivery end, i.e., the right hand end of FIG. 1;

FIG. 4 represents a side elevation of the tool, showing the side opposite that of FIG. 1, part of the handle being broken away;

FIG. 5 represents a section on the line V—V of FIG. 4;

FIG. 6 represents a detail vertical section on the line VI—VI of FIG. 3, and

FIG. 7 represents a detail vertical section on the line VII—VII of FIG. 5.

Referring to the drawings the tool comprises a cable guide 11, the saw blade housing 12, the blade and cable drive assembly 13, and the cut depth adjustment assembly 14.

The cable guide 11 is an elongated angular shape having an upper wall 15, a lower wall 16, a side wall 17 and a slanting wall 18 which intersects the upper wall 15 at an apex 19 where the walls define an interior angle of about 100°–170°, as shown and described in the cited prior U.S. Pat. No. 3,851,387, with particular reference to FIG. 5 thereof. The lower wall 16 extends about half the length of the cable guide, terminating toward the cutting end in a clevis 20, traversed by a pivot pin 21 on which is mounted one end of the roller guide arm 22, the free end of which carries the conical roller 23 on an axle 24. The arm 22 is biased strongly upward, toward the upper wall 15, by a torsion spring 25 associated with the pivot pin. In the region above the roller 23 a slot 26 is formed in the upper wall 15 to permit entry of the cutting edge of the saw blade into a working zone, parallel to and space a short distance from the apex 19. A piece of cable is shown at C.

The saw blade housing 12 comprises the blade guard 30, at one end, and the elongated lever portion 31, the end of which is pivoted at 32 on the lug 33 projecting upward from the upper wall 15 of the cable guide. The blade guard 30 contains a cavity 34 adapted to receive the saw blade and to enclose about 75% thereof; the guard has a thickened wall 35 in which is journaled the main drive shaft.

The blade and cable drive assembly includes the gear box 40, traversed in its upper portion by the main shaft 41 which carries on one end the circular saw blade 42 and on its other end the crank handle 43, the shaft being journaled in the guard wall 35 and the gear box being spaced from said wall by the flanged bushing 44, press fitted into a hole in wall 35, the flange 36 of the bushing, in cavity 34, serving to limit the axial play of the saw blade. In the lower portion of the gear box a shaft 45 is journaled in the thickened wall portion 46, the shaft carrying the cable driving roller 47 which is conical and sharply serrated, to effectively engage the cable surface. The main shaft 41 is operatively connected to the roller shaft 45 through the reducing gear train 48, 49, 50 (FIGS. 5 and 7), the reduction being such that, when the blade 42 is rotated at an adequate cutting speed the driving roller rotates slowly to advance the cable only as a cut to the full adjusted depth has been effected. A strong torsion spring 51 surrounds the ferrule 44 and biases the gear box, around the main shaft 41 as a pivot, in a direction to hold the driving roller 47 firmly against the cable, i.e., clockwise in FIG. 1.

The depth adjustment assembly 14 is mounted adjacent one end of the upper wall 15 of the cable guide, and comprises a threaded stud 55 held in a vertical hole by the set screw 56 and projecting upwardly through a slot 57 in projection 31' on the blade guard 30. The stud is traversed at its base by a detent pin 58, above which is a double face cam 59, freely rotatable on the stud by means of a lever 60, the cam having pairs of oppositely disposed concave steps 61 arranged helically on complementary 180° sectors of the cam face, for selective engagement with the pin 58. Above the cam there are a pair of spherical washers 62, 63, between the cam and projection 31' and above said projection is a flat washer 64 against which the thumb nut lock 65 can be tightened. From this description, referring to FIGS. 1 and 6, it will be evident that the distance of penetration of the saw blade through the slot 26, into its working (cutting) zone, can be adjusted by loosening the thumb nut 65, turning the cam to bring a desired pair of steps 61 into register with the detent pin 58 and tightening the nut 65 to hold the parts in their adjusted position.

The taper angles of the conical rollers 23 and 47, which may be the same or slightly different, are such that the roller surfaces at the line of contact with the cable lie substantially perpendicular to the plane containing the apex 19 and bisecting the angle between guide walls 15 and 18. As a result of this relationship, cables C of various sizes may be held accurately and securely in position to be cut (FIGS. 3 and 5), the cutting path of the blade being near enough to radial to give satisfactory results in each case.

In operation, the desired depth of cut is determined and the depth adjustment cam 59 is set accordingly. The tool is engaged with a cable, either by feeding a cable end into the guide from the left of FIGS. 1 and 2 in a manner to force the rollers 23 and 47 down as far as necessary or by manually displacing the rollers and their supporting parts so that the tool may be applied to a piece of cable intermediate the ends thereof by introducing it laterally into the space between the lower and upper walls 16, 15 of the guide 11. With the cable in place, the tool is held in one hand (or in a support such as a vise) and the blade is rotated by means of the crank handle 43 to cut the shielding and/or armor to the desired depth, the cable being moved relatively to the tool by the rotation of the driving roller 47, as explained above. When a cut of the desired length has been completed, the tool and cable are separated and the cut material is removed in any appropriate manner.

It will thus be seen that the objects set forth above, among those made apparent from the preceding description, are efficiently attained and, since certain changes may be made in carrying out the above method (process) without departing from the spirit and scope of the invention, it is intended that all matter contained in the above description shall be interpreted as illustrative and not in a limiting sense.

What I claim is:

1. A cutting tool for making an axially extended incision in the surface of an armored cable comprising a saw blade housing having an elongated lever portion and a blade guard, a cable guide pivotally connected to said lever portion and having elongated angularly disposed walls defining a path for the cable, means for resiliently urging the cable into said path, a circular saw blade carried on a main shaft journaled in the blade guard, said saw blade projecting a predetermined distance into said path in a position to cut through the surface of the cable, means for driving said saw blade, a serrated cable driving roller on a shaft and engageable with the cable from a direction opposite to said walls for moving the cable relatively to the tool and a reduction gear train between the main shaft and the driving roller shaft, the gear train being enclosed in a housing and the housing being pivoted on said main shaft, whereby the driving roller is moveable relative to the cable guide.

2. A cutting tool for making an axially extended incision in the surface of an armored cable comprising a saw blade housing having an elongated lever portion and a blade guard, a cable guide pivotally connected to said lever portion and having elongated angularly disposed walls defining a path for the cable, means for resiliently urging the cable into said path, a circular saw blade carried on a main shaft journaled in the blade guard, said saw blade projecting a predetermined distance into said path in a position to cut through the surface of the cable, means for driving said saw blade, a serrated cable driving roller on a shaft and engageable with the cable from a direction opposite to said walls for moving the cable relatively to the tool, a reduction gear train between the main shaft and the driving roller shaft, and adjustable means for determining the projection of the saw blade mounted on the cable guide and adapted to determine the angular relation between the saw blade housing and the cable guide, the adjustable means including a face cam movable to different positions and means for locking the cam in each selected position.

3. A cutting tool for making an axially extended incision in the surface of an armored cable comprising a saw blade housing having an elongated lever portion and a blade guard, a cable guide pivotally connected to said lever portion and having angularly disposed walls defining a path for the cable, means for resiliently urging the cable toward the angular junction of the walls and into said path, a circular saw blade carried by a main shaft journaled in the blade guard, said saw blade projecting a predetermined distance into said path in a position to cut through the surface of the cable, means for driving said saw blade, a sharply serrated conical driving roller on a shaft and engageable with the cable from a direction opposite to said walls for moving the cable relatively to the tool, the saw blade driving means being operatively connected to the cable moving means and said operative connection comprising a reduction gear train, and adjustable means operatively connected to the saw blade housing and to the cable guide for determining the projection of the saw blade, the adjustable means including a double helix face cam movable to different positions and means for locking the cam in each selected position.

* * * * *